United States Patent [19]

Bangs et al.

[11] Patent Number: 4,462,037

[45] Date of Patent: Jul. 24, 1984

[54] INK LEVEL CONTROL FOR INK JET PRINTER

[75] Inventors: Richard G. Bangs; Jacob E. Thomas, both of Ithaca, N.Y.

[73] Assignee: NCR Corporation, Dayton, Ohio

[21] Appl. No.: 385,955

[22] Filed: Jun. 7, 1982

[51] Int. Cl.[3] .......... G01D 15/18

[52] U.S. Cl. .......... 346/140 R; 346/75

[58] Field of Search .......... 346/75, 140 R, 140 PD

[56] References Cited

U.S. PATENT DOCUMENTS

| | | | |
|---|---|---|---|
| 3,452,361 | 6/1969 | Williams, Jr. | 346/140 R |
| 4,149,172 | 4/1979 | Heinzl et al. | 346/140 PD |
| 4,323,907 | 4/1982 | Italiano | 346/140 PD |
| 4,340,896 | 7/1982 | Cruz-Uribe et al. | 346/140 PD |
| 4,399,446 | 8/1983 | McCann et al. | 346/75 X |
| 4,413,267 | 11/1983 | Hein | 346/75 |

*Primary Examiner*—George H. Miller, Jr.

*Attorney, Agent, or Firm*—J. T. Cavender; Wilbert Hawk, Jr.; George J. Muckenthaler

[57] ABSTRACT

The level of ink in a reciprocating reservoir is automatically controlled for both printing and non-printing conditions. The reciprocating motion creates forces to cause the ink to move back and forth between the reciprocating reservoir and a main reservoir and a pump maintains the ink at one level during printing. The pump controls the direction and flow of ink moving between the reservoirs by continuous operation during printing and the ink is allowed to rise in the first-mentioned reservoir during non-printing.

20 Claims, 2 Drawing Figures

INK LEVEL CONTROL FOR INK JET PRINTER

CROSS-REFERENCE TO RELATED APPLICATIONS

Ink Evaporation Prevention Means For Ink Jet Printer, U.S. Pat. No. 4,412,233, issued to J. E. Thomas and J. K. McKnight on Oct. 25, 1983.

Ink Level control For Ink Jet Printer, co-pending application Ser. No. 385,965, filed June 7, 1982, invented by Jacob E. Thomas, and assigned to NCR Corporation.

Ink Control For Ink Jet Printer, U.S. Pat. No. 4,418,353, issued to J. E. Thomas on Nov. 29, 1983.

Ink Control For Ink Jet Printer, co-pending application Ser. No. 385,967, filed June 7, 1982 invented by Jacob E. Thomas, and assigned to NCR Corporation.

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is wellknown, the impact operation depends upon the movement of impact members, such as print hammers or wires or the like, which are typically moved by means of an electromechanical system and which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case of non-impact printing, the precise control of the thermal elements and of the ink droplets is necessary to provide for both correct and high-speed printing.

In the matter of ink jet printing, it is extremely important that the control of the ink droplets be both precise and accurate from the time of formation of the droplets to depositing of such droplets on paper or like record media and to make certain that a clean printed character results from the ink droplets. While the method of printing with ink droplets may be performed in either a continuous manner or in a demand pulse manner, the latter type method and operation is disclosed and is preferred in the present application when applying the features of the present invention. The drive means for the ink droplets is generally in the form of a well-known crystal or piezoelectric type element to provide the high-speed operation for ejecting the ink through the nozzle, while allowing time between droplets for proper operation. The ink nozzle construction must be of a nature to permit fast and clean ejection of ink droplets from the print head.

In the ink jet printer, the print head structure may be a multiple nozzle type with the nozzles aligned in a vertical line and supported on a print head carriage which is caused to be moved or driven in a horizontal direction for printing in line manner.

Alternatively, the printer structure may include a plurality of equally-spaced horizontally-aligned single nozzle print heads which are caused to be moved in back-and-forth manner to print successive lines of dots in making up the lines of characters. In this latter arrangement, the drive elements or transducers are individually supported along a line of printing.

In a still different structure, the nozzles are spaced in both horizontal and vertical directions, and the vertical distance between centers of the ink jets equals the desired vertical distance between one dot and the next adjacent dot above or below the one dot on the paper. The horizontal distance is chosen to be as small as mechanically convenient without causing interference between the actuators, reservoirs, and feed tubes associated with the individual jets. The axes of all jets are aligned approximately parallel to each other and approximately perpendicular to the paper. Thus, if all nozzles were simultaneously actuated, a sloped or slanted row of dots would appear on the paper and show the dots spaced both horizontally and vertically. In order to produce a useful result consisting of dots arranged as characters, it is necessary to sweep the ink jet head array back and forth across the paper, and actuate each individual nozzle separately when it is properly located to lay down a dot in the desired position. A vertical row of dots is created by sequentially actuated the nozzles rather than simultaneous actuation, the latter being the preferred practice in the more common nozzle arrangements.

A further observation in ink jet printers is that previous and current designs for drop-on-demand ink jet print heads are sensitive to the ingestion of air into or the presence of air in the supply of ink. Even a small air bubble can interrupt or fault the performance of transducers or like devices that expel ink droplets from a nozzle by means of pressure pulses created within an ink-filled chamber or channel.

The use of a fast-action valve or like device to control the flow of ink to a single ink jet printing nozzle is known in specific applications, but in certain cases, the concept and heretofore-known structure has been considered costly and impractical. Additionally, the supply of ink to a plurality of ink jet nozzles may be controlled by means of a single control device wherein the nozzles are connected to a common manifold and ink droplet ejection is accomplished by momentarily increasing the pressure in the manifold.

After the droplets of ink have been ejected from the nozzles, the ink is replenished thereat from a remote supply by the capillary action of the meniscus at the end of the nozzle. In certain of the control devices and arrangements, it has been found that some difficulties arise from the capillary action refill or replenish process and there are adverse effects on the performance and reliability of such printers.

In normal operation of an ink jet print head, it is well-known that a negative meniscus of ink should be maintained at the nozzle, that the relative levels of ink in the various parts or areas of the system have an effect on the printing operation, and further, that the movement of the several printer elements affects the flow of ink during the printing cycle.

Representative documentation in the field of ink control means for ink jet printers includes U.S. Pat. No. 3,737,914, issued to C. H. Hertz on June 5, 1973, which discloses a liquid jet recording system in which an electrically-conductive fluid is pressure-ejected through capillary nozzles to form jets directed toward a recording sheet and wherein a group of the jet nozzles are mounted in a common plane and are movable periodically in side-to-side direction.

U.S. Pat. No. 4,042,937, issued to F. J. Perry et al. on Aug. 16, 1977, discloses an ink supply system for an ink jet head which includes an inlet valve connecting a pump in the line from a reservoir to the head and an outlet valve connecting an outlet from the head to the reservoir. At time of shut off, the inlet valve is closed with the outlet valve open to create a negative pressure in the head.

U.S. Pat. No. 4,079,384, issued to R. Takano et al. on Mar. 14, 1978, discloses an ink liquid supply system having an ink cartridge, an ink reservoir, a pump and a cross valve in the supply line.

U.S. Pat. No. 4,153,902, issued to Y. Kanayama on May 8, 1979, discloses an ink liquid supply system wherein a subtank is interposed between an ink reservoir and a pump in the supply line. A valve and a pair of filters are also provided in the line.

SUMMARY OF THE INVENTION

The present invention relates to ink jet printers, and more particularly, to control means which includes a pump provided in one line between an ink supply tank and a second tank carrying an ink jet nozzle. The ink supply system provides a main reservoir which is stationary and vented to the atmosphere, and a local reservoir which is carried on a carriage movable in back-and-forth manner along a print line relative to paper or like record media. The local reservoir has at least one print head supported from and carried therewith in reciprocating manner during the printing operation.

The ink is caused to flow from the main reservoir through a tube having a constriction device for preventing or minimizing surges of ink into the local reservoir. A filter is also included in the constriction device for continuous filtration of the ink. An ink return line from the local reservoir to the main reservoir includes a fluid pump to cause a continuous flow of ink therebetween to maintain the ink level in the local reservoir at a certain and desired level.

The apparatus and arrangement provides for controlling and maintaining the level of ink slightly above the inlet height of the return line or tube when the carriage is reciprocating in a printing condition or operation, and then allowing the ink level to rise to the level of the ink in the main reservoir or approximately to the height of the ink jet print head nozzle when the print head is idle or in the non-printing condition.

A modification in the main reservoir and the reciprocating local reservoir arrangement includes apparatus for causing the main reservoir to be moved in a vertical direction to provide the pumping action between the reservoirs and to maintain the desired level of ink.

In view of the above discussion, the principal object of the present invention is to provide means permitting controlled amount of ink to flow between separate reservoirs in an arrangement to be used for marking or printing on record media.

Another object of the present invention is to provide means for controlling flow of ink from a supply thereof to at least one ink jet nozzle.

An additional object of the present invention is to provide means for controlling flow of ink between a main reservoir and a reciprocating reservoir carrying an ink jet print head.

A further object of the present invention is to provide a main reservoir and a reciprocating reservoir of ink along with pumping means therebetween for maintaining the ink in the reservoirs at predetermined levels during both printing conditions and non-printing conditions.

Another object of the present invention is to provide a main reservoir and a reciprocating reservoir wherein the main reservoir is caused to be moved in up-and-down manner to provide pumping action for maintaining the ink in the reservoirs at predetermined levels.

Additional advantages and features of the present invention will become apparent and fully understood from a reading of the following description taken together with the annexed drawing.

DESCRIPTION OF THE PREFERRED EMBODIMENT

Figure 1:
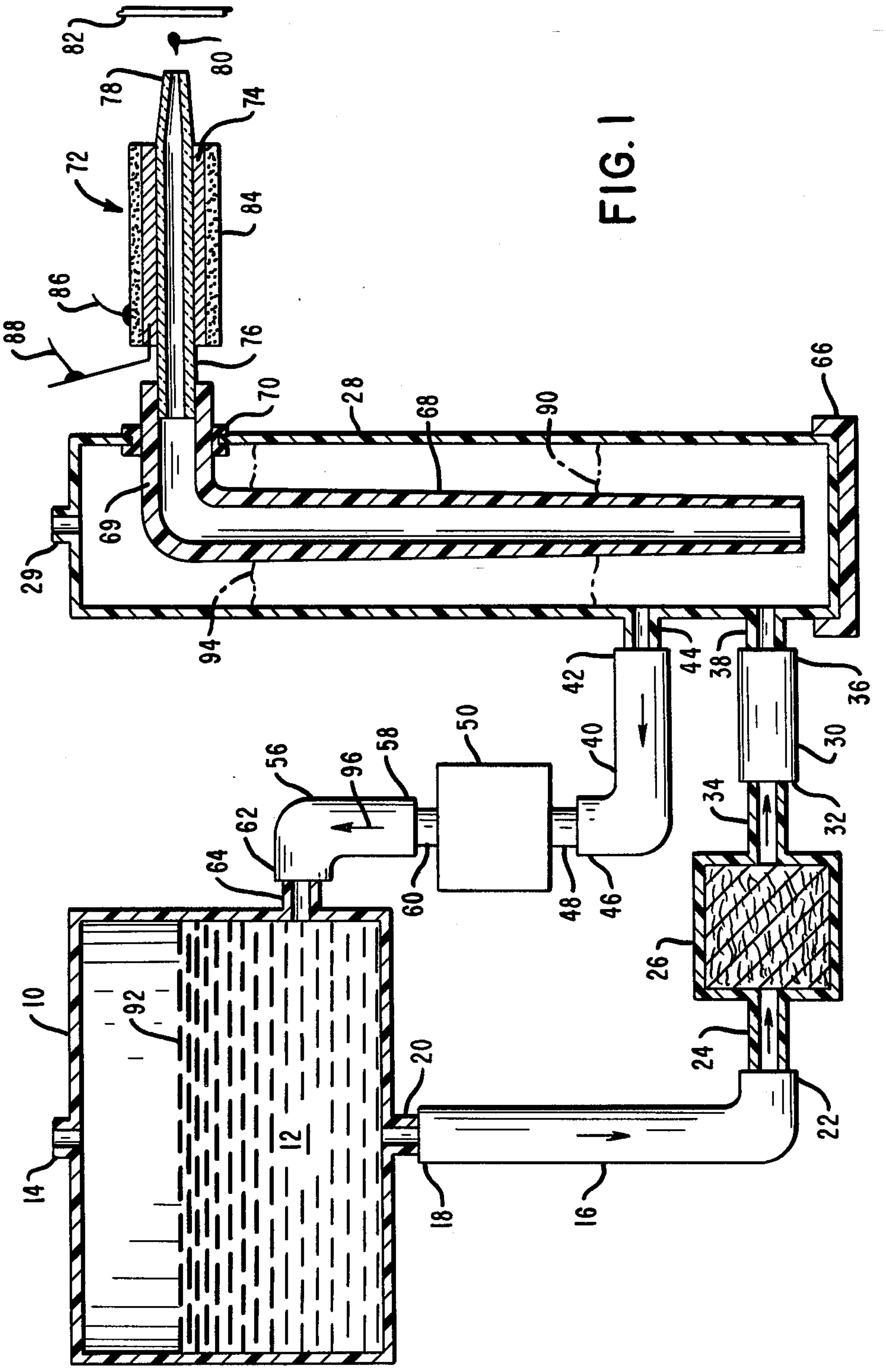
FIG. 1 is a diagrammatic view, partly in section, of a printing system incorporating the subject matter of the present invention.

As seen in FIG. 1 of the drawing, an ink reservoir 10 contains a supply of printing ink 12 which is sufficient for printing in excess of several million characters. The reservoir 10 has a filter-type vent 14 suitably disposed in the top thereof for access to the atmosphere. A length of flexible tubing 16 is connected at one end 18 thereof to the outlet 20 of the reservoir 10 and is connected at the other end 22 thereof to an inlet 24 of a constricting-type device 26 which is formed of suitable material to dampen or impede the flow of ink from a main or remote reservoir 10 to a second or local reservoir 28. The reservoir 28 also has a filter-type vent 29 disposed in the top thereof. A second flexible tube 30 is connected at one end 32 thereof to an outlet 34 of the device 26 and is connected at the other end 36 to an inlet 38 of the reservoir 28. The tubes 16 and 30 provide an ink supply passageway for flow of ink from the main reservoir 10 to the device 26 and from such device to the local reservoir 28.

A return path for the flow of ink is provided from the reservoir 28 to the reservoir 10. A flexible tube 40 is connected at one end 42 thereof to an outlet 44 (above the inlet 38) of the reservoir 28 and is connected at the other end 46 thereof to the inlet 48 of a pump 50 which is suitable for causing ink to flow from the reservoir 10 to the reservoir 28 in continuous manner under printing operation or conditions. The pump 50 may be a common and well-known, electrically energized, type for causing a negative pressure in the reservoir 28 and producing a continuous flow between the two reservoirs 10 and 28 in the arrangement for establishing the proper ink level at the proper time for printing operations. Actuation of the pump 50 during printing operations establishes a level for the ink in reservoir 28, which is a condition required for proper operation of the ink jet printer. A flexible tube 56 is connected at one end 58 thereof to the outlet 60 of the pump 50 and is connected at the other end 62 thereof to an inlet 64 of the main reservoir 10.

The secondary or local reservoir 28 is secured to or supported from a movable carriage 66 which causes the reservoir to be moved in a reciprocating manner in a direction to and from the observer, as viewed in the drawing. A feed tube 68, of a length and extending from near the bottom of the reservoir 28 to a height which is above the normal level of ink in the main reservoir 10, includes an upper outlet portion 69 which extends through a wall portion or grommet 70 of the reservoir 28 to an ink jet print head 72. The several tubes utilized in the system may be made of Tygon (a polyvinyl chloride material manufactured by The Norton Chemical Company).

The print head 72 includes a body portion 74 of cylindrical form having a glass tube or glass-lined passageway 76 through the body portion for receiving and connecting to the feed tube portion 69 and terminating in a nozzle 78 for ejecting a droplet 80 of printing ink to be applied to record media 82, which media may be in the form of paper or the like and supported in suitable manner around a drum or from a platen (not shown).

The print head 72 may be of a type as disclosed in Arndt U.S. Pat. No. 3,832,579, appropriate for and commonly used in ink jet printing operations, and which includes a piezoelectric device or tubular type transducer 84 for causing ejection of the ink droplets 80, either in synchronous or asynchronous manner, from the print head nozzle 78. The ink droplets 80, so produced from the nozzle 78, are essentially the same or constant in size and are normally ejected at a constant velocity. Leads 86 and 88 are appropriately connected to the print head 72 for actuating the transducer 84 so as to cause ejection of the ink droplets 80 in well-known manner.

In the operation of the printing system, the pump 50 is turned on along with the printer and the reservoir 28 is caused to be moved by the reciprocating motion of the carriage 66 in a printing condition wherein the motion of the carriage creates forces which tend to cause the ink to be moved back and forth, or in a somewhat defined supply-and-return cycle between the reservoirs 10 and 28. Prior to printing operation, i.e. when the reservoir 28 along with the print head 72 are rapidly moving or reciprocating in the back-and-forth direction, the pump 50 is called into operation and causes the level of ink 12 in the local reservoir 28 to be lowered and then maintained approximately at or slightly above the level indicated at 90, which is slightly above the height of the outlet 44 and the end 42 of the tube 40, and which level is substantially below the level 92 of the ink 12 in the main reservoir 10. The pump 50 thus provides a continuous circulating flow of ink 12 between the two reservoirs 10 and 28 during printing operations and in a manner wherein the flow of ink is dampened or reduced and the ink is also continuously filtered by the device 26. An added feature may include an ink level sensor or automatic level sensing device (not shown) which may be connected inside the local reservoir 28 and used to control the pump 50 in an arrangement to allow the proper level of ink during printing operation or conditions, but would turn the pump off at a low ink level condition.

When the printing operation ceases or when the reservoir 28 along with the print head 72 are not moving or reciprocating, as in the non-printing or rest condition, the ink 12 in the local reservoir 28, by reason of gravity, slowly rises above the height of the outlet 44 and may rise to a level indicated at 94, corresponding generally with the level 92 of ink 12 in the main reservoir 10 and approximately to or slightly below the height of the print head 72. In this respect, the ink levels 92 and 94 tend to be equalized through the ink supply tubes 16 and 30 and since the level of ink 12 in the reservoir 28 is above the outlet 44 thereof, the pump 50 is ineffective in a non-running condition and due to the increasing level of ink in the reservoir 28, the gravitational flow of ink 12 is in the direction from the main reservoir 10 to the local reservoir 28 for substantially filling the latter.

It is seen that the system provides for simple pumping means with two distinct levels of ink in the ink reservoir 28 directly associated with the operation of and directly supplying the ink jet print head 72. The idle or non-printing level at 94 in the local reservoir 28 is approximately at print head height and the operating or printing level at 90 is about two inches lower or at approximately the height of the outlet 44 and of the return tube 40. The motion of the carriage 66, on which the print head 72 and the reservoir 28 are mounted, along with the continuous operation of the pump 50 provide the driving force to pump the ink 12 from the main reservoir 10 to the local reservoir 28 and additionally, the pump 50 ensures that the ink 12 moves only in the proper direction during certain conditions, all in a manner and arrangement wherein the ink level control is considered to be automatically controlled during both idle or non-printing periods and operating or printing periods.

It is seen that the constriction device 26 in the supply line to the local reservoir 28, the pump 50 in the return line to the main reservoir 10, and the location of the inlet 44 for the return tube 40 all provide for and prevent unwanted surges in the ink 12 which are caused by motion of the carriage 66. If such surges were allowed to occur, the pressure in the reservoir 28 would suddenly change and cause ink to be unintentionally ejected from the nozzle 78 or to cause air to be ingested therein.

Figure 2:
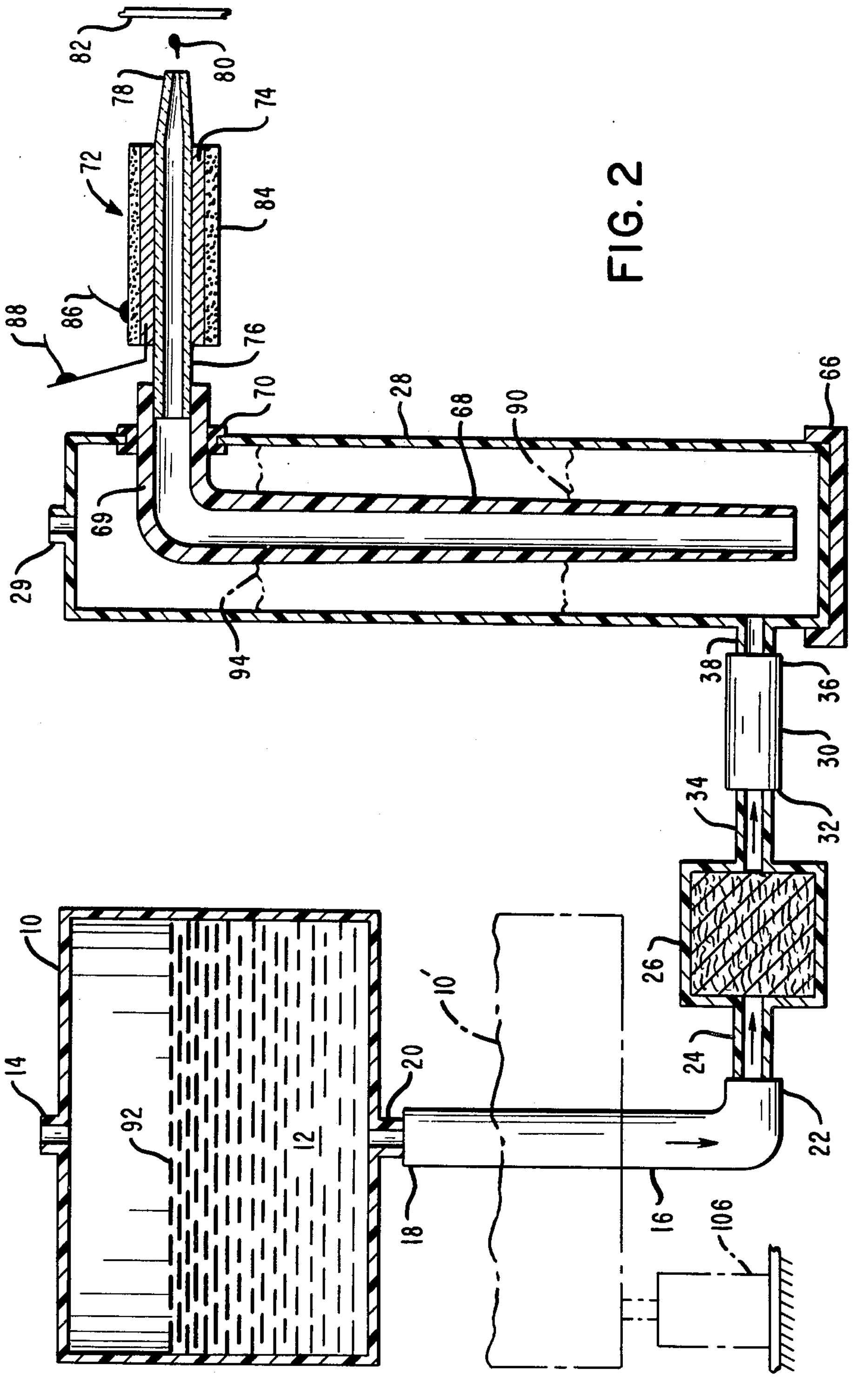
FIG. 2 is a modification of the printing system of FIG. 1.

In an alternate system or modification of the above-described arrangement, the pump has been omitted (as seen in FIG. 2) along with the return line which included the flexible conduits or tubes 40 and 56 connected to the local reservoir 28 and to the main reservoir 10 for carrying ink 12 therebetween, as seen in FIG. 1. Since the same reference numerals are used for the identical elements in FIG. 2 as were used in FIG. 1, the complete detailed description is not repeated. In the alternate system of FIG. 2, means is provided for raising and lowering the main reservoir 10 in relation to the local reservoir 28 and thereby establish the two levels of ink in the local reservoir.

The particular means employed for raising and lowering the reservoir 10 may be a simple hydraulic lift mechanism or a solenoid operated device, such as diagrammatically illustrated at 106, which mechanism or device is capable of operating in a raising and lowering range of several centimeters. The reservoir 10 is raised or elevated to the position shown in FIG. 2, and under idle or non-printing conditions, the level of the ink 12 is approximately at ink jet nozzle 72 height. Under operating or printing conditions, the main reservoir 10 is lowered by operation of the mechanism or device 106 so that the level 92 of ink 12 therein corresponds generally to the ink level 90 in the local reservoir 28. Thus, the level of ink in the moving reservoir 28 will descend to a predetermined point and settle or stop at that point. In similar manner as mentioned above, when the carriage 66 and the reservoir 28 are not moving, the ink level will slowly rise by flowing through the supply tubes 16 and 30 until the two reservoirs 10 and 28 have approximately equal ink levels, or rather, the ink 12 in the two reservoirs 10 and 28 is at approximately the same height.

It is thus seen that herein shown and described is an ink jet printing system which includes means to control the level of the ink during both printing and non-printing conditions. A supply line and a return line for the ink are connected between a stationary reservoir and a reciprocating reservoir, and the ink is caused to flow by movement of the reciprocating reservoir and by action of a pump to effect continuous circulation and attain one ink level in the local reservoir during printing and to allow the ink to rise to another level therein when idle or non-printing. The alternate or modified system also utilizes movement of the reciprocating reservoir to cause flow of ink, and an elevator mechanism controls the level of ink in the two reservoirs during printing and non-printing. When the main reservoir is being lowered prior to printing, the flow of ink is in the direction from the local reservoir to the main reservoir, whereas raising the main reservoir causes flow of ink therefrom to the local or reciprocating reservoir. The apparatus of the present invention enables the accomplishment of the objects and advantages mentioned above, and while a preferred embodiment has been disclosed herein, along with a modification thereof, other variations may occur to those skilled in the art. It is contemplated that all such variations not departing from the spirit and scope of the invention hereof are to be construed in accordance with the following claims.

We claim:

1. Means for controlling the level of ink in an ink jet printing system comprising a first reservoir containing a quantity of ink, a second reservoir containing a quantity of ink, means providing an ink supply line and an ink return line connecting the first and the second ink reservoirs, means operably associated with said second reservoir for ejecting ink in droplet form, and means associated with the ink return line for causing continuous flow of ink from the second reservoir to the first reservoir and establishing a first ink level in the second reservoir adjacent the ink return line during operation of the printing system and for allowing flow of ink from the first to the second reservoir and establishing a second ink level in the second reservoir adjacent the ink ejecting means during non-operation of the printing system.

2. The subject matter of claim 1 wherein the ink flow causing means comprises a circulating pump operating during printing operation to establish said first ink level and non-operating to permit flow of ink through the ink supply line to establish said second ink level.

3. The subject matter of claim 1 wherein the ink ejecting means is a tubular transducer.

4. The subject matter of claim 1 wherein the first reservoir is a stationary reservoir and the ink flow causing means is a pump operating continuously during operation of the printing system.

5. The subject matter of claim 4 wherein the second reservoir is a movable reservoir carrying the ink ejecting means.

6. The subject matter of claim 4 including means associated with the ink supply line for damping the flow of ink to the second reservoir.

7. The subject matter of claim 4 wherein the ink supply line and the ink return line are flexible tubes allowing movement of the second reservoir in relation to the first reservoir.

8. Ink level controlling means comprising a first reservoir containing a quantity of ink, a second reservoir containing a quantity of ink, means connecting the first and second reservoirs and providing ink supply and ink return lines therebetween, and pump means operably associated with the ink return line for causing continuous flow of ink from the second to the first reservoir when the ink is at one level in the second reservoir adjacent the ink return line during printing conditions and for allowing flow of ink from the first to the second reservoir to pursue a higher level in the second reservoir during non-printing conditions.

9. The subject matter of claim 8 including a transducer operably associated with and carried by said second reservoir for ejecting ink therefrom in droplet form.

10. The subject matter of claim 8 wherein said first reservoir is stationary and said second reservoir is movable and includes an elongated ink feed tube therein.

11. The subject matter of claim 10 wherein the ink supply line and the ink return line are flexible conduits permitting movement of the second reservoir relative to the first reservoir.

12. The subject matter of claim 10 including means associated with the ink supply line for restricting flow of and for filtering ink traveling from the first to the second reservoir.

13. The subject matter of claim 10 wherein the ink flow causing means comprises a circulating pump operating during printing conditions when the ink is at said one level and non-operating to permit flow of ink through the ink supply line to pursue said higher level.

14. In an ink jet printer having a first reservoir of ink and a second reservoir of ink movable in relation to the first reservoir, means connecting the first and second reservoirs to provide an ink supply line and an ink return line therebetween, the improvement comprising means for causing the second reservoir to move in reciprocating manner during printing conditions enabling flow of ink into the second reservoir and attain a predetermined level therein adjacent the ink return line connected thereto, and means operably associated with the ink return line causing continuous flow of ink from the second reservoir to the first reservoir while maintaining such predetermined level under printing conditions and enabling the level of ink to pursue a higher level in said second reservoir during non-printing conditions.

15. In the printer of claim 14 including a transducer operably associated with and carried by said second reservoir for ejecting ink therefrom in droplet form.

16. In the printer of claim 14 wherein the operably associated means is a circulating pump operating during printing conditions to maintain said predetermined level and non-operating to permit flow of ink through the ink supply line to pursue said higher level.

17. An ink jet printer comprising a first reservoir containing a supply of ink, a second reservoir connected with said first reservoir, means for moving said second reservoir in reciprocating manner during operation of the printer, means operably associated with the second reservoir for ejecting ink in droplet form, and means for moving said first reservoir downwardly relative to said second reservoir for establishing one ink level in the second reservoir during operation of the printer and for moving the first reservoir upwardly relative to the second reservoir for establishing another ink level in the second reservoir during non-operation of the printer.

18. The ink jet printer of claim 17 wherein the ink ejecting means is a tubular transducer.

19. The ink jet printer of claim 17 including a flexible ink supply line connecting the first and the second reservoirs and means associated with the ink supply line for damping flow of ink to the second reservoir.

20. The ink jet printer of claim 17 wherein the means for moving the first reservoir is effective to lower the first reservoir to establish in said second reservoir said one ink level at a height above the connection thereof with said first reservoir and to raise the first reservoir to establish in said second reservoir said another ink level at a height substantially adjacent the ink ejecting means.

* * * * *